US006195157B1

(12) United States Patent
Yamashita et al.

(10) Patent No.: US 6,195,157 B1
(45) Date of Patent: *Feb. 27, 2001

(54) PROCESS FOR DETERMINING ABNORMALITY OF DETECTION IN A DISTANCE SENSOR FOR A VEHICLE

(75) Inventors: Kazuo Yamashita; Akira Sugiyama; Shigenori Ogino, all of Wako (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,594

(22) Filed: Sep. 17, 1998

(30) Foreign Application Priority Data

Sep. 19, 1997 (JP) .................................................. 9-254492

(51) Int. Cl.⁷ ................................ B60T 7/16; B62D 1/24; G01C 3/08
(52) U.S. Cl. .......................................... 356/4.01; 180/169
(58) Field of Search ........................... 180/169; 356/4.01, 356/5.01–5.15

(56) References Cited

U.S. PATENT DOCUMENTS

| 4,639,129 | * | 1/1987 | Hullein et al. . |
| 5,321,490 | * | 6/1994 | Olson et al. . |
| 5,633,705 | * | 5/1997 | Asayama ............................. 356/5.01 |
| 5,633,706 | * | 5/1997 | Cho et al. ............................ 180/169 |

FOREIGN PATENT DOCUMENTS

9199568 * 2/1999 (JP) .

* cited by examiner

Primary Examiner—Stephen C. Buczinski
(74) Attorney, Agent, or Firm—Arent Fox Kintner Plotkin & Kahn, PLLC

(57) ABSTRACT

The deterioration of receiving environment of a reflected signal from a preceding vehicle in an auto-cruise control is immediately detected, so that the distance between the vehicle and the preceding vehicle detected by a distance sensor comprising a laser radar, is maintained constant. On the basis of data of the magnitude of received signals, which are detected by the distance sensor and accumulated over a predetermined time, a standard deviation (or a dispersion) and an average value of the magnitude of the received signal are calculated. If the standard deviation is equal to or larger than a reference value or the average value is equal to or smaller than a reference value when the distance sensor has not detected a reflected signal, it is determined that the environment of reception of the reflected signal from the preceding vehicle has deteriorated, whereby the auto-cruise control is discontinued, or the deterioration of the receiving environment is informed to a driver by an informing device.

4 Claims, 4 Drawing Sheets

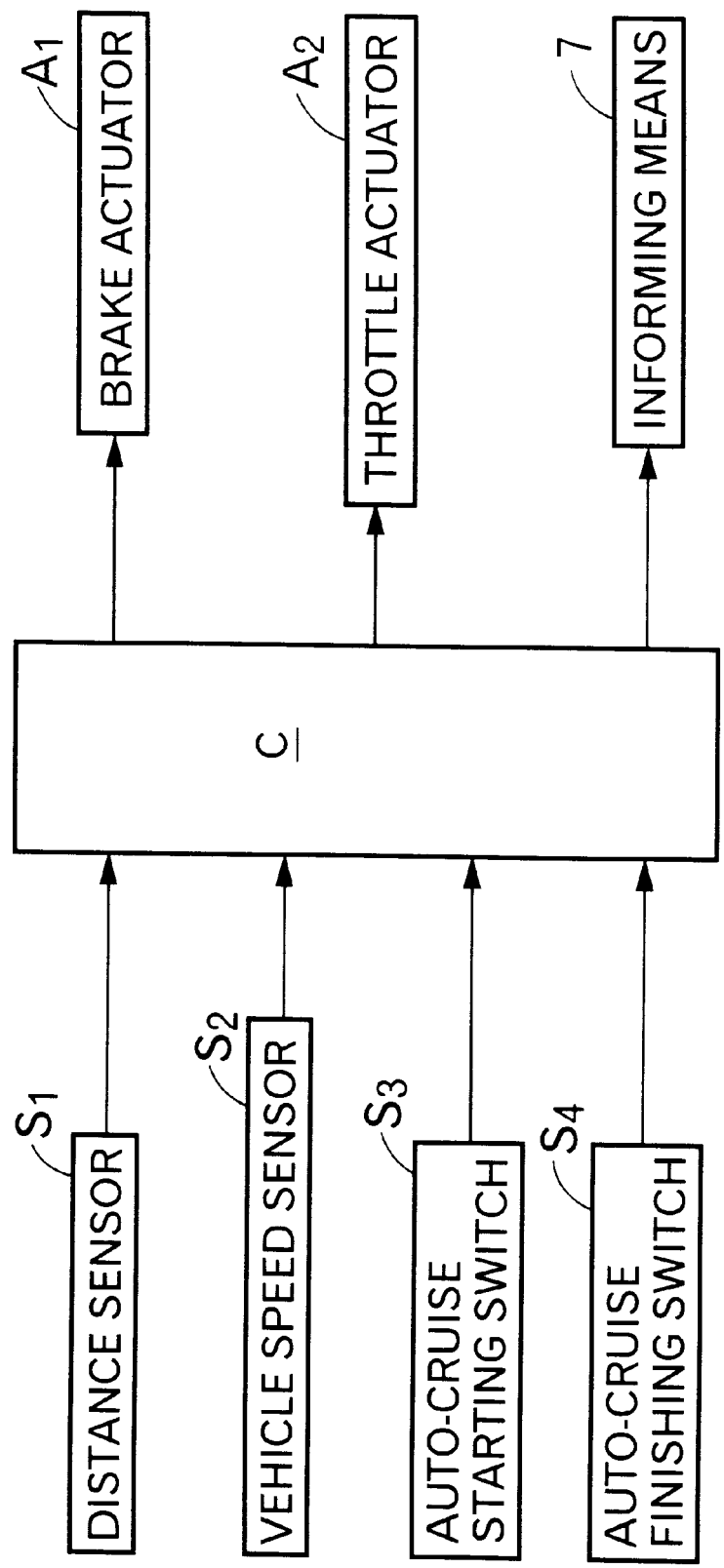

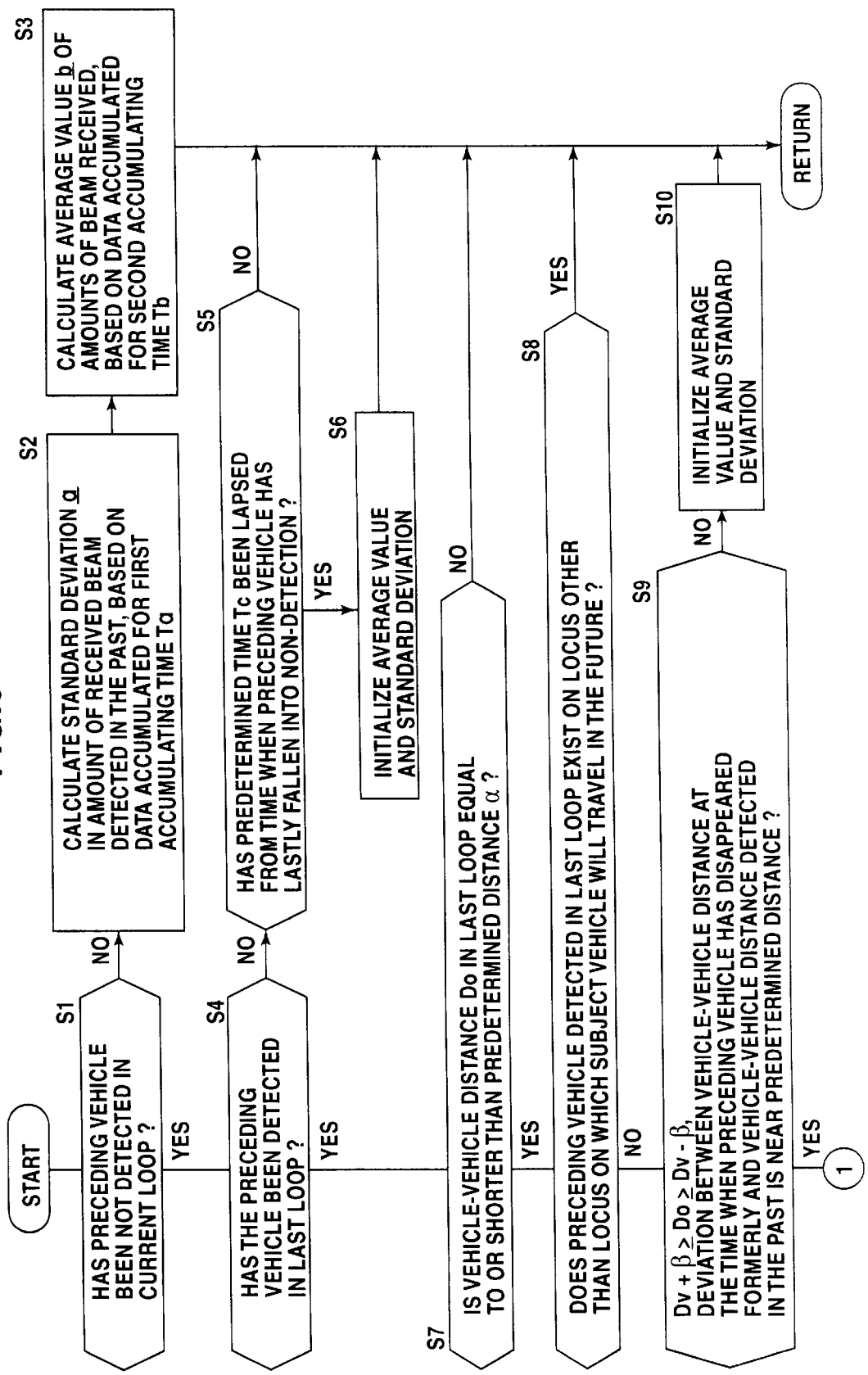

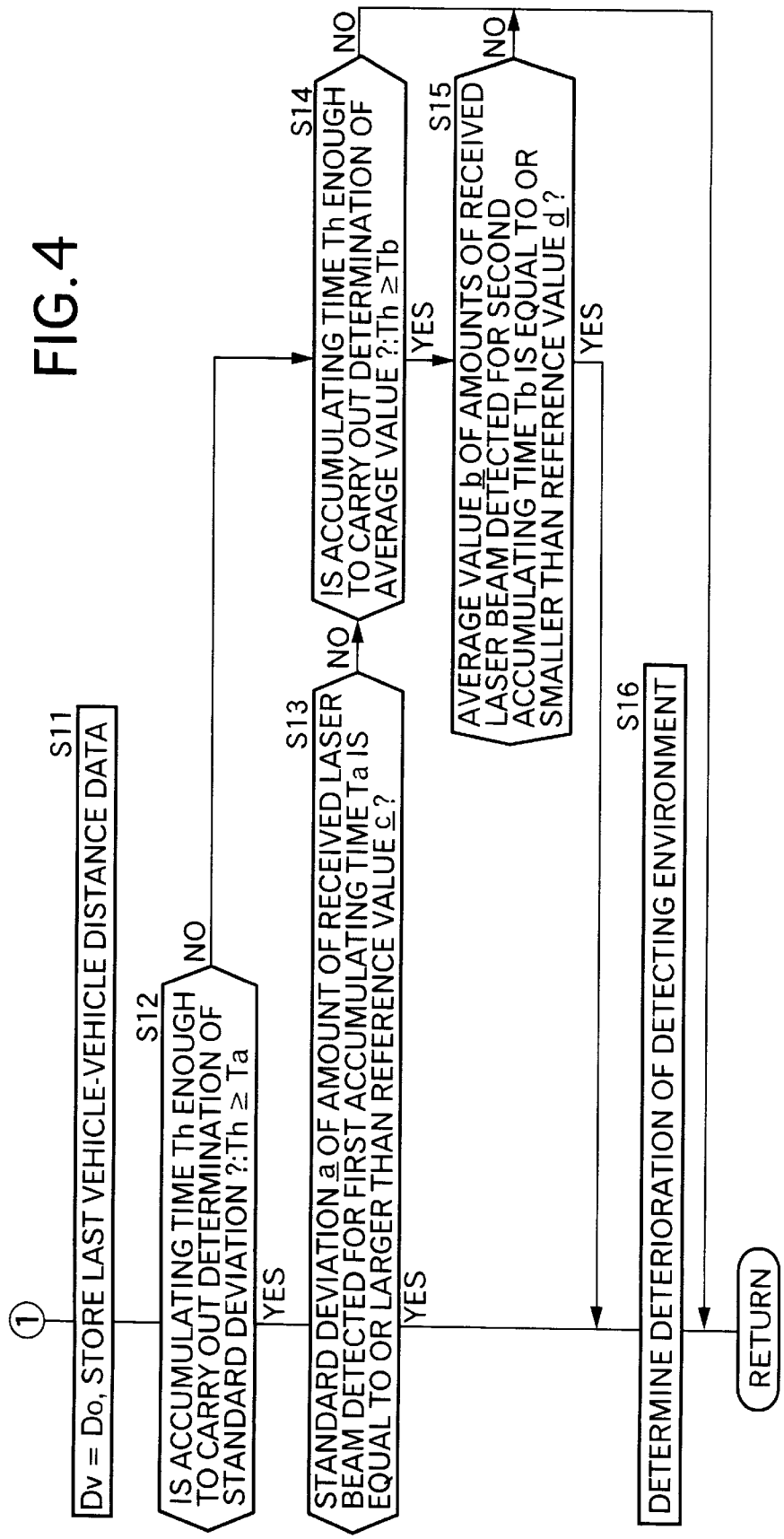

PROCESS FOR DETERMINING ABNORMALITY OF DETECTION IN A DISTANCE SENSOR FOR A VEHICLE

BACKGROUND OF THE INVENTION

1. Field of the Invention

The present invention relates to a distance sensor for a vehicle for detecting the distance from a vehicle to an object ahead of the vehicle, based on the time from the transmission of an optical signal to the reception of a reflected optical signal by means of transmitting the optical signal ahead of the vehicle and receiving the optical signal reflected from the object, and particularly, a process for determining an abnormality of detection in the distance sensor.

2. Description of the Relevant Art

An auto-cruising system is conventionally well-known, which is designed to allow a vehicle to travel following a target vehicle, by detecting the distance between the vehicle and the target vehicle traveling ahead of the vehicle using a radar device having a laser beam, and controlling the speed of the vehicle, so that the vehicle—vehicle distance is maintained at a predetermined value. In such an auto-cruising system, when a rear portion of the target vehicle is soiled which decreases the magnitude of the reflected signal of the laser beam, or when the target vehicle has raised a large amount of water or snow from a road surface, the state of reception of the reflected signal is deteriorated and as a result, the distance between the vehicle and the target vehicle may not be properly detected, resulting in the possibility that although the target vehicle actually exists, it is mis-determined that the target vehicle does not exist.

There is already proposed in Japanese Patent Application 9-199568, an auto-cruising system in which when the deterioration of the receiving environment is detected based on the magnitude of the signal reflected from the target vehicle and on interrupted or discontinuous supply of data on the distance between the vehicle and the target vehicle, the auto-cruise control is discontinued, or a warning is emitted to a driver.

In the previously proposed system, however, when the reception of the signal is started again after the interruption of the reception of the reflected signal from the target vehicle, the deterioration of the receiving environment is detected. For this reason, it is desirable that the deterioration of the receiving environment can be detected earlier.

SUMMARY OF THE INVENTION

The present invention has been accomplished with the above circumstance in view, and it is an object of the present invention to immediately detect the deterioration of the environment of the reception of the reflected signal from the target vehicle.

To achieve the above object of the present invention, there is provided a process for determining an abnormality of detection in a distance sensor for a vehicle which detects the distance from the vehicle to an object ahead of the vehicle, based on the time from the transmission of an optical signal to the reception of the reflected optical signal by means of transmitting the optical signal ahead of the vehicle and receiving the optical signal reflected from the object. When the variation in magnitude of the signal received from the object before the object falls into a non-detected state, becomes equal to or larger than a reference value which indicates the deterioration of the environment of reception of the signal, the abnormality of the detection is determined.

With the above feature, if the magnitude of the signal received is decreased, the variation in the magnitude of the signal received is increased, and the abnormality of the detection is determined when the variation in the magnitude of the signal received becomes equal to or larger than a reference value. Therefore, it is possible to immediately determine the deterioration of the receiving environment as soon as the object falls into a non-detected state. The reference value may be a value for enabling the deterioration of the receiving environment to be determined, and is a selected value which is set properly.

The variability is a standard deviation or a dispersion, and thus the extent of the variation in the magnitude of the signal received can be properly determined.

There is also provided a process for determining an abnormality of detection in a distance sensor which detects the distance from a vehicle to an object ahead of the vehicle, based on the time from the transmission of an optical signal to the reception of the reflected optical signal by means of transmitting the optical signal ahead of the vehicle and receiving the optical signal reflected from the object. When the average value of the magnitude of the signal received from the object before the object falls into a non-detected state, becomes equal to or smaller than a reference value which indicates the deterioration of the environment of the reception of the signal, the abnormality of the detection is determined.

Thus, if the magnitude of the signal received is decreased, the average value of the magnitude of the signal received decreases, the abnormality of the detection is determined when the average value of the magnitude of the signal received becomes equal to or smaller than the reference value. Therefore, it is possible to immediately determine the deterioration of the receiving environment as soon as the object falls into a non-detected state. The reference value may be a value for enabling the deterioration of the receiving environment to be determined, and is a selected value which is set properly.

In addition, when the object is within a predetermined distance from the vehicle, the determination of the abnormality of the detection is carried out. Therefore, it is possible to avoid a mis-determination of the abnormality of the detection due to a decrease in the magnitude of the signal received with the movement of the object away from the vehicle. The predetermined distance is set at 60 m in the embodiment, but may be varied depending upon the performance of the distance sensor.

When the deviation between the distance from the vehicle to the object when the object falls into a non-detected state, in the current cycle and the distance from the vehicle to the object when the object falls into the non-detected state, in the prior cycle is within a predetermined distance, the determination of the abnormality of the detection is carried out.

When a different object has been detected after the object falls into the non-detected state, the deviation between the distances from the vehicle to the respective objects becomes equal to or larger than the predetermined distance, whereby the determination of the abnormality of the detection is not carried out. Therefore, it is possible to prevent the determination of the abnormality of the detection from being carried out based on data from different objects. The predetermined distance is set at 10 m in the embodiment, but may be varied depending upon the performance of the distance sensor.

BRIEF DESCRIPTION OF THE DRAWINGS

The mode for carrying out the present invention will now be described by way of an embodiment shown in the accompanying drawings.

FIG. 2 is a block diagram of a control system of the embodiment.

FIG. 3 is a first portion of a flow chart for explaining the operation of the embodiment.

FIG. 4 is a second portion of the flow chart for explaining the operation of the embodiment.

DETAILED DESCRIPTION OF THE PREFERRED EMBODIMENT

Figure 1:
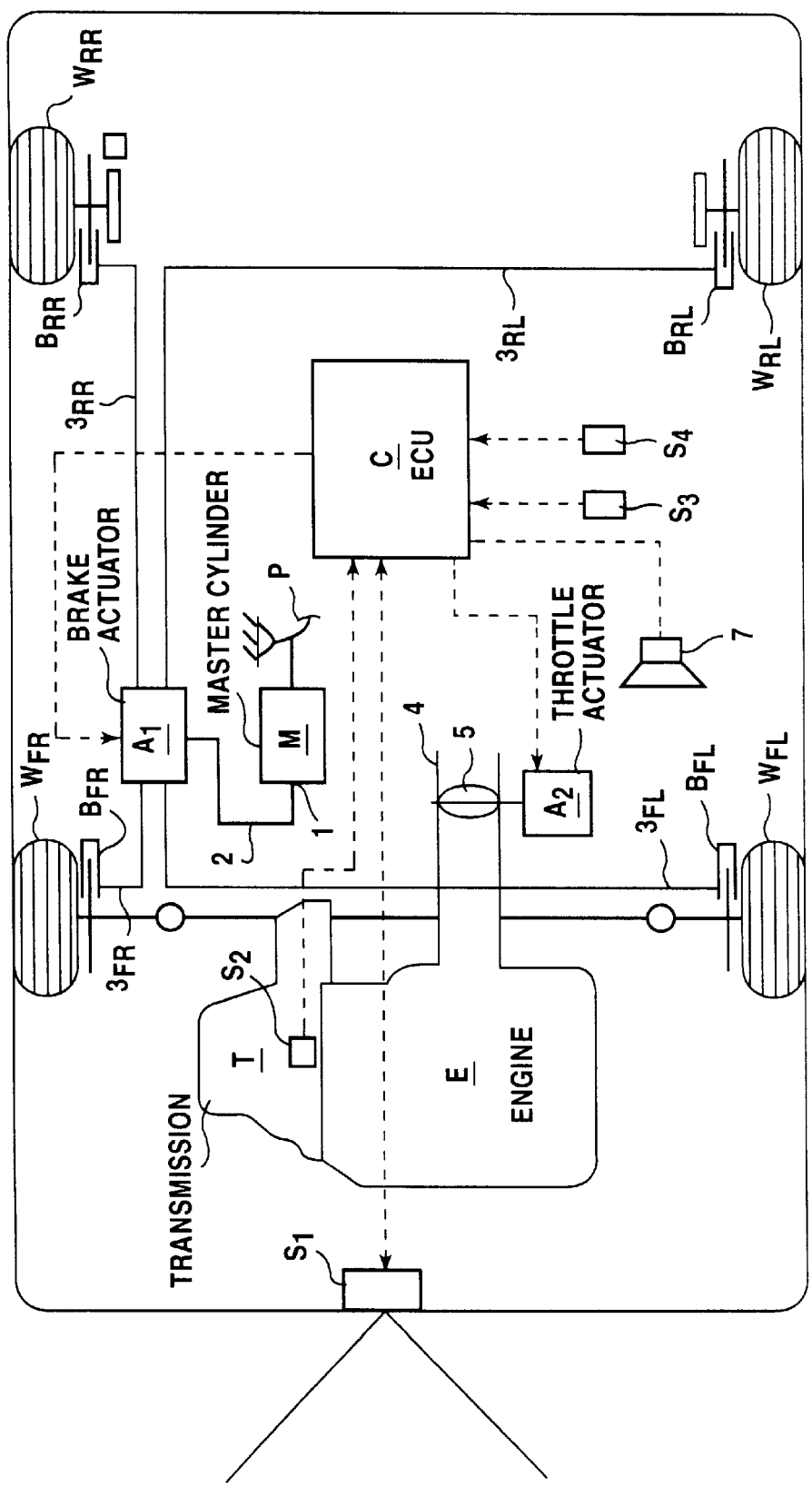
FIG. 1 is an illustration of the entire arrangement of a vehicle including an auto-cruising system according to an embodiment of the present invention.

As shown in FIG. 1, a left front wheel disk brake $B_{FL}$ and a right front wheel disk brake $B_{FR}$ are mounted on a left front wheel $W_{FL}$ and a right front wheel $W_{FR}$ respectively, which are the driven wheels of a front wheel drive vehicle. A left rear wheel disk brake $B_{RL}$ and a right rear wheel disk brake $B_{RR}$ are mounted on a left rear wheel $W_{RL}$ and a right rear wheel $W_{RR}$ respectively, which are the follower wheels.

A brake actuator $A_1$ is mounted between an oil passage 2 connected to an output port 1 of a master cylinder M for generating a braking hydraulic pressure corresponding to the depression of a brake pedal P, and oil passages $3_{FL}$, $3_{FR}$, $3_{RL}$ and $3_{RR}$ individually connected to the disk brakes $B_{FL}$, $B_{FR}$, $B_{RL}$ and $B_{RR}$. The brake actuator $A_1$ is capable of being switched between a state in which the oil passage 2 and the oil passages $3_{FL}$, $3_{FR}$, $3_{RL}$ and $3_{RR}$ are put into communication with each other during non-operation of the brake actuator $A_1$ to apply braking hydraulic pressure from the master cylinder M to each of the disk brakes $B_{FL}$, $B_{FR}$, $B_{RL}$ and $B_{RR}$, and a state in which the oil passage 2 and the oil passages $3_{FL}$, $3_{FR}$, $3_{RL}$ and $3_{RR}$ are cut off from each other during operation of the brake actuator $A_1$.

A throttle actuator $A_2$ is connected to a throttle valve 5 mounted in an intake passage 4 of an engine E, so that the opening degree of the throttle valve 5, namely, an engine output is controlled by the operation of the throttle actuator $A_2$.

A distance sensor $S_1$ is mounted at a front portion of the vehicle and comprises a laser radar which is capable of transmitting a laser beam ahead of the vehicle and receiving a laser beam reflected from a vehicle traveling ahead of the vehicle (which will be referred to as a preceding vehicle hereinafter). The distance sensor is capable of calculating the distance from the vehicle to the preceding vehicle which is a target vehicle, based on a time lag from the transmission of the laser beam to the reception of the reflected laser beam. When the magnitude of the laser beam reflected from the preceding vehicle becomes less than a predetermined value, the distance sensor $S_1$ cannot detect the preceding vehicle.

As can be seen by reference of FIG. 2 in addition to FIG. 1, an electronic control unit C receives a signal from the distance sensor $S_1$, a signal from a vehicle speed sensor $S_2$ for detecting the vehicle speed based on the number of rotation speed of the output shaft of a transmission T connected to the engine E, a signal from an auto-cruise starting switch $S_3$, and a signal from an auto-cruise finishing switch $S_4$.

The electronic control unit C controls the operation of the brake actuator $A_1$ and the throttle actuator $A_2$ to decelerate or accelerate the vehicle, so that when the auto-cruise starting switch $S_3$ is operated to start the auto-cruise control, the distance between the vehicle and the preceding vehicle detected by the distance sensor $S_1$ is maintained at a predetermined distance. The auto-cruise is finished when the auto-cruise finishing switch $S_4$ is operated, when an accelerator pedal (not shown) is depressed, when the brake pedal P is depressed, when the vehicle speed detected by the vehicle speed sensor $S_2$ becomes less than a predetermined value, or when the environment of detecting the distance between the vehicle and the preceding vehicle has deteriorated. When the deterioration of the detecting environment occurs, an informing means 7 such as buzzer, a chime, a lamp or the like is operated to inform a driver of the deterioration.

A technique for detecting the deterioration of the environment for detection by the distance sensor $S_1$ will be described below in detail. The essential point of the technique for detecting the deterioration of the detecting environment is consideration that if the detecting environment is deteriorated, the magnitude of the laser beam received by the distance sensor $S_1$ is unstable as compared with a normal environment and hence, the variation (standard deviation or dispersion) in magnitude of the laser beam received is increased, or the average value of the magnitude of the laser beam received is decreased. The detection of the deterioration of the detecting environment is carried out by comparing the variation in magnitude of the laser beam received or the average value of the magnitude of the laser beam received with predetermined reference values.

First, when the distance sensor $S_1$ detects the preceding vehicle at Step S1 in a current cycle, the processing is shifted to Step S2, at which data of the magnitude of the laser beam received in the current cycle is added to the accumulated data of the received laser beam magnitudes detected in prior cycles. When the accumulating time reaches a first accumulating time Ta (e.g., 5 seconds), a standard deviation a, which is an index of the variation in the magnitude of the laser beam received, is calculated based on the data accumulated for such time. At subsequent Step S3, data of the magnitude of the laser beam received in the current cycle is likewise added to the accumulated data of the received laser beam magnitude detected in prior cycles, and when the accumulating time reaches a second accumulating time Tb (e.g., 5 seconds), an average value b of the received laser beam magnitude is calculated based on the data accumulated for such time.

When the distance sensor $S_1$ does not detect the preceding vehicle in the current cycle at Step S1, and the distance sensor $S_1$ does not detect the preceding vehicle in the prior cycle at Step S4, namely, when the preceding vehicle is not detected continuously in two cycles, the processing is shifted to Step S5. If a predetermined time Tc (e.g., 5 seconds) has lapsed from the time point when the preceding vehicle last fell into non-detection at Step S5, the standard deviation a and the average value b calculated at Steps S2 and S5 are initialized at Step S6. Namely, even if the preceding vehicle is detected again after the lapse of the predetermined time Tc from the time point when the preceding vehicle fell into non-detection, there is a possibility that the preceding vehicle again detected is not the same as the previously detected preceding vehicle. Thus, the problem of accumulation of data of a different preceding vehicle can be avoided by initializing the standard deviation a and the average value b.

When the distance sensor $S_1$ has not detected the preceding vehicle in the current cycle at Step S1 and the distance sensor $S_1$ has detected the preceding vehicle in the last cycle at Step S4, namely when the preceding vehicle has fallen into non-detection for the first time in the current cycle, the processing is shifted to Step S7. If the distance $D_0$ between the vehicle and the preceding vehicle detected in the last cycle is not equal to or smaller than a predetermined distance α (e.g., 60 m) at Step S7, namely, when the magnitude of the received laser beam required for determination due to a larger vehicle-vehicle distance is inherently not obtained, the processing is returned to Step S1 without being shifted to Step S8.

If the distance $D_0$ between the vehicle and the preceding vehicle is equal to or smaller than the predetermined distance α at Step S7, the processing is shifted to Step S8, where it is determined whether the preceding vehicle detected in the last cycle exists on a locus other than a locus on which the vehicle will travel in the future. If the preceding vehicle detected in the last cycle exists on a locus other than the locus on which the vehicle will travel in the future, it is determined that the preceding vehicle has changed its lane, and the processing is returned to Step S1 without being shifted to Step S9.

At subsequent Step S9, a deviation between a vehicle-vehicle distance $D_v$ at the time when the preceding vehicle has disappeared and the vehicle-vehicle distance $D_0$ detected in the last cycle is compared with a predetermined distance β (e.g., 10 m). If the deviation exceeds the predetermined distance β, the standard deviation 1 and the average value b calculated in Steps S2 and S3 are initialized at Step S10. Namely, even if the preceding vehicle has fallen into non-detection, the calculation of the standard deviation a and the average value b is continued if the preceding vehicle is detected again within the predetermined time Tc (see Step S5). However, the accumulation of data of a different preceding vehicle can be eliminated because if the deviation exceeds the predetermined distance β, it is determined that the preceding vehicle currently detected is different from the preceding vehicle detected previously, and the standard deviation a and the average value b are initialized.

At subsequent Step S11, the distance between the vehicle and the preceding vehicle detected in the last cycle is stored as a vehicle—vehicle distance Dv at the time when the preceding vehicle has disappeared. Then, if the data accumulating time Th is equal to or greater than the first accumulating time Ta at Step S12 to indicate that the calculation of the standard deviation a of the magnitude of the laser beam received is completed, the processing is shifted to Step S13. If the standard deviation a is equal to or larger than a reference value c as a result of the comparison of the standard deviation a with the reference value c at Step S13 to indicate a larger variation in the detected magnitude of the received laser beam, then it is determined at Step S16 that the environment of detection by the distance sensor $S_1$ has deteriorated, whereby a warning is emitted to the driver by the informing means 7, and at the same time, the auto-cruise control based on the vehicle-vehicle distance detected by the distance sensor $S_1$ is discontinued.

If the standard deviation a is smaller than the reference value C at Step S13 to indicate a smaller variation in the vehicle—vehicle distance, or if the calculation of the standard deviation a of the magnitude of the laser beam received is not completed at Step S12, the processing is advanced to Step S14. If the data accumulating time Th is equal to or larger than the second accumulating time Tb at Step S14 which indicates that the calculation of the average value b of the magnitude of the laser beam received has been completed, the processing is advanced to Step S15. If the average value b is equal to or smaller than the reference value d at Step S15 as a result of the comparison of the average value b with the reference value d to indicate a small magnitude of the laser beam received, it is determined at Step S16 that the environment of the detection by the distance sensor $S_1$ has deteriorated, whereby a warning is emitted to the driver by the informing means 7 and at the same time, the auto-cruise control based on the vehicle-vehicle distance detected by the distance sensor $S_1$ is discontinued.

In this way, when the standard deviation a of the magnitude of the received laser beams accumulated over the first accumulating time Ta is equal to or larger than the reference value c, or when the average value b of the magnitude of the received laser beam accumulated over the second accumulating time Tb is equal to or smaller than the reference value d, it is determined that the environment of the detection by the distance sensor $S_1$ has deteriorated. Therefore, the deterioration of the environment of the detection can be determined without a time lag from the occurrence of the deterioration of the actual detecting environment, and the auto-cruise control can be properly discontinued.

The distance sensor $S_1$ in the above-described embodiment has been used in an auto-cruising system in the vehicle, but may be utilized in other applications such as a collision avoiding system for a vehicle or the like. The standard deviation has been used as the index of the variation of the magnitude of the laser beam received in the embodiment, but a dispersion may be used in place of the standard deviation.

As discussed above, considering that if the magnitude of the signal received is decreased, the variation in the magnitude of the signal received is increased, and the abnormality of the detection is determined when the variation in the magnitude of the signal received becomes equal to or larger than a reference value. Therefore, it is possible to immediately determine the deterioration of the receiving environment as soon as the object falls into a non-detected state. Further, the extent of the variation in the magnitude of the signal received can be properly determined.

Considering that if the magnitude of the signal received is decreased, the average value of the magnitude of the signal received is decreased, and the abnormality of the detection is determined when the average value of the magnitude of the signal received becomes equal to or smaller than a reference value. Therefore, it is possible to immediately determine the deterioration of the receiving environment as soon as the object falls into a non-detected state.

When the object is within a predetermined distance from the vehicle, and the abnormality of the detection is carried out, it is possible to avoid the mis-determination of the abnormality of the detection due to a decrease in the magnitude of the signal received with the movement of the object away from the vehicle.

When a different object has been detected after an object falls into a non-detected state, a deviation between the distances from the vehicle to the respective objects becomes equal to or greater than the predetermined distance, whereby the determination of the abnormality of detection is not carried out. Therefore, it is possible to prevent the determination of the abnormality of detection from being carried out based on data from the different objects.

Although the embodiment of the present invention has been described in detail, it will be understood that the present invention is not limited to the above-described embodiment, and various modifications in design may be made without departing from the subject matter of the invention.

What is claimed is:

1. A process for determining an abnormality in the detection of a distance by a vehicle distance sensor including a radar, said vehicle distance sensor detecting the distance from the vehicle to an object ahead of the vehicle, said process comprising the steps of:

(a) transmitting a signal from the radar, ahead of the vehicle;

(b) receiving a reflected signal reflected by an object ahead of the vehicle;

(c) determining the distance between the vehicle and the object based on the time between the transmission of the signal and the receipt of the reflected signal;

(d) determining the variation in the magnitude of the reflected signal from the object and determining when the variation becomes equal to or larger than a first reference value prior to the object falling into a non-detected state, wherein a reflected signal which is equal to or larger than the reference value indicates a deterioration in the environment of reception of the signal whereby the abnormality of the detection of the distance is determined;

wherein the determination of the abnormality is made when said object is within a predetermined distance from the vehicle and wherein a deviation between a distance from the vehicle to the object which has fallen into a non-detected state in a current detection cycle and a distance from the vehicle to the object which has fallen into the non-detected state in the previous detection cycle is within a predetermined distance.

2. A process for determining an abnormality of detection in a distance sensor for a vehicle according to claim 1, wherein the variation is a standard deviation.

3. A process for determining an abnormality of detection in a distance sensor for a vehicle according to claim 1, wherein the variation is a dispersion.

4. A process for determining an abnormality in the detection of a distance by a vehicle distance sensor including a radar, said vehicle distance sensor detecting the distance from the vehicle to an object ahead of the vehicle, said process comprising the steps of:

(a) transmitting a signal from the radar, ahead of the vehicle;

(b) receiving a reflected signal reflected by an object ahead of the vehicle;

(c) determining the distance between the vehicle and the object based on the time between the transmission of the signal and the receipt of the reflected signal;

(d) determining the average of the magnitude of the reflected signal from the object and determining when the average of the magnitude becomes equal to or smaller than a second reference value prior to the object falling into a non-detected state, wherein a reflected signal which is equal to or smaller than the reference value indicates a deterioration in the environment of reception of the signal whereby the abnormality of the detection of the distance is determined, and wherein the determination of the abnormality is made when said object is within a predetermined distance from the vehicle and wherein a deviation between a distance from the vehicle to the object which has fallen into a non-detected state in a current detection cycle and a distance from the vehicle to the object which has fallen into the non-detected state in the previous detection cycle is within a predetermined distance.

* * * * *